United States Patent
Wang et al.

(10) Patent No.: US 10,969,624 B2
(45) Date of Patent: Apr. 6, 2021

(54) BACKLIGHT MODULE AND DISPLAY DEVICE

(71) Applicants: Beijing BOE Optoelectronics Technology Co., Ltd., Beijing (CN); BOE Technology Group Co., Ltd., Beijing (CN)

(72) Inventors: Xuerong Wang, Beijing (CN); Lu Yu, Beijing (CN); Junjie Ma, Beijing (CN); Lei Chen, Beijing (CN); Fei Gao, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 217 days.

(21) Appl. No.: 16/084,902

(22) PCT Filed: Feb. 11, 2018

(86) PCT No.: PCT/CN2018/076235
§ 371 (c)(1),
(2) Date: Sep. 13, 2018

(87) PCT Pub. No.: WO2019/015314
PCT Pub. Date: Jan. 24, 2019

(65) Prior Publication Data
US 2020/0301204 A1  Sep. 24, 2020

(30) Foreign Application Priority Data
Jul. 18, 2017 (CN) .......................... 201710588245.4

(51) Int. Cl.
*G02F 1/13357* (2006.01)
*F21V 8/00* (2006.01)
(Continued)

(52) U.S. Cl.
CPC ..... *G02F 1/133606* (2013.01); *G02B 6/0025* (2013.01); *G02B 6/0031* (2013.01);
(Continued)

(58) Field of Classification Search
CPC ........ G02F 2001/133601; G02F 2001/133606; G09G 3/36; G02B 6/0025; G02B 6/0031
See application file for complete search history.

(56) References Cited

U.S. PATENT DOCUMENTS 6,819,393 B1    11/2004  Date et al.
7,478,938 B2 *   1/2009  Watanabe ............. G02B 6/005
                                                      362/607
(Continued)

FOREIGN PATENT DOCUMENTS

CN       101170642 A     4/2008
CN       101833921 A     9/2010
(Continued)

OTHER PUBLICATIONS

Apr. 28, 2018—(WO) International Search Report and Written Opinion Appn PCT/CN2018/076235 with English Translation.
(Continued)

*Primary Examiner* — Matthew J. Peerce
(74) *Attorney, Agent, or Firm* — Banner & Witcoff, Ltd.

(57) ABSTRACT

A backlight module and a display device are disclosed. The backlight module includes a light source component, and an illumination rendering film located on a light exiting side of the light source component. The illumination rendering film includes a plurality of dimming units arranged in an array; each of the dimming units is configured to receive a dimming signal and change a transmittance of the each of the dimming units according to the dimming signal.

16 Claims, 6 Drawing Sheets

(51) Int. Cl.
*G02F 1/1334* (2006.01)
*G02F 1/1337* (2006.01)

(52) U.S. Cl.
CPC .......... *G02F 1/1334* (2013.01); *G02F 1/1337* (2013.01); *G02F 1/133603* (2013.01); *G02F 2001/133601* (2013.01); *G02F 2001/133607* (2013.01); *G02F 2001/133612* (2013.01)

(56) References Cited

U.S. PATENT DOCUMENTS

| | | | |
|---|---|---|---|
| 9,672,764 B2 * | 6/2017 | Watanabe | G09G 3/3648 |
| 9,753,596 B2 | 9/2017 | Aoki et al. | |
| 10,591,769 B2 | 3/2020 | Harada et al. | |
| 2009/0207613 A1 | 8/2009 | Furukawa et al. | |
| 2013/0300981 A1 | 11/2013 | Sakai | |
| 2014/0293188 A1 * | 10/2014 | Chen | G09G 3/3426 349/65 |
| 2015/0002563 A1 | 1/2015 | Chen et al. | |
| 2015/0029437 A1 | 1/2015 | Sakai et al. | |
| 2016/0093255 A1 | 3/2016 | Aoki et al. | |
| 2016/0155402 A1 | 6/2016 | Hoshino | |
| 2017/0256210 A1 | 9/2017 | Kato | |
| 2019/0064599 A1 | 2/2019 | Zhao et al. | |

FOREIGN PATENT DOCUMENTS

| | | |
|---|---|---|
| CN | 102679238 A | 9/2012 |
| CN | 203745755 U | 7/2014 |
| CN | 105807485 A | 7/2016 |
| CN | 105911737 A | 8/2016 |
| CN | 106019711 A | 10/2016 |
| CN | 106405882 A | 2/2017 |
| CN | 106782382 A | 5/2017 |
| CN | 106952621 A | 7/2017 |
| CN | 107132697 A | 9/2017 |
| CN | 107908042 A | 4/2018 |
| CN | 108445578 A | 8/2018 |
| CN | 109154736 A | 1/2019 |
| KR | 1020070025120 A | 3/2007 |

OTHER PUBLICATIONS

Apr. 17, 2019—(CN) First Office Action Appn 201810284973.0 with English Translation.
Oct. 9, 2020—U.S. Office Action U.S. Appl. No. 16/641,717.

* cited by examiner

BACKLIGHT MODULE AND DISPLAY DEVICE

The application is a U.S. National Phase Entry of International Application No. PCT/CN2018/076235 filed on Feb. 11, 2018, designating the United States of America and claiming priority to Chinese Patent Application No. 201710588245.4 filed on Jul. 18, 2017. The present application claims priority to and the benefit of the above-identified applications and the above-identified applications are incorporated by reference herein in their entirety.

TECHNICAL FIELD

The present disclosure relates to a backlight module and a display device.

BACKGROUND

Recently, development of High Dynamic Range (HDR) technology has once again set off a wave of application of local dimming technology on display devices. With the user's pursuit of display quality technology, the abovementioned local dimming technology can be used to make the display image have more light and dark dynamic range and image details, so that the user can be provided with an image with higher image quality. However, in the existing art, in order to achieve the abovementioned local dimming technology, it is generally required to separately adjust the LED lamps in the backlight. In this way, the LED lamps are easily damaged during the repeated adjustment process, and the service life of the backlight is reduced.

SUMMARY

Some embodiments of the present disclosure provide a backlight module, comprising: a light source component, and an illumination rendering film located on a light exiting side of the light source component, the illumination rendering film comprises a plurality of dimming units arranged in an array; each of the dimming units is configured to receive a dimming signal and change a transmittance of the each of the dimming units according to the dimming signal.

In some examples, each of the dimming units comprises a transmittance adjustment layer and a control electrode for controlling the transmittance adjustment layer, the control electrode is configured to generate an electric field for controlling a transmittance of the transmittance adjustment layer according to the dimming signal.

In some examples, the control electrode comprises a first electrode and a second electrode which are located on two opposite sides of the transmittance adjustment layer.

In some examples, controlling the transmittance of the transmittance adjustment layer comprises controlling a haze of the transmittance adjustment layer.

In some examples, the transmittance adjustment layer comprises a polymer dispersed liquid crystal layer.

In some examples, the polymer dispersed liquid crystal layer has a thickness of 120 μm±5 μm.

In some examples, the transmittance adjustment layer comprises a polymer stabilized liquid crystal layer and two alignment layers located on two sides of the polymer stabilized liquid crystal layer.

In some examples, the transmittance adjustment layer comprises a liquid crystal layer and two alignment layers located on two sides of the liquid crystal layer.

In some examples, the illumination rendering film further comprises an insulating protective layer covering the first electrode and/or the second electrode.

In some examples, the light source component comprises a light guide plate and a light source located on at least one lateral face of the light guide plate.

In some examples, the light source component further comprises a diffusion sheet located on a light exiting side of the light guide plate, at least one prism sheet, and a reflective film located on an opposite side of the light exiting side of the light guide plate.

In some examples, the light source component comprises a light source array, and a diffusion plate and at least one prism sheet which are sequentially located on a light exiting side of the light source array.

In some examples, the at least one prism sheet comprises a first prism sheet and a second prism sheet; the first prism sheet comprises a prism extending in a first direction, the second prism sheet comprises a prism extending in a second direction, and the first direction and the second direction are perpendicular to each other.

In some examples, the backlight module further comprises: a processor configured to provide the dimming signal to the dimming unit.

In some examples, the plurality of dimming units are configured to be capable of independently receiving different dimming signals.

Some embodiments of the present disclosure provide a display device, comprising: a display panel; and the backlight module according to any one of claims 1-15 and configured to provide light for the display panel.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

FIG. 3b is an image after high dynamic rendering of the image shown in FIG. 3a;

REFERENCE NUMBERS

01—backlight module; 02—display panel; 10—light source component; 101—light guide plate; 102—light source; 103—diffusion sheet; 104—prism sheet; 1041—first prism sheet; 1042—second prism sheet; 114—prism; 105—reflective sheet; 110—back plate; 111—support column; 112—light source array; 113—diffusion plate; 115—lower diffusion sheet; 116—upper diffusion sheet; 20—illumination rendering film; 201—dimming unit; 210—first electrode; 220—second electrode; 230—transmittance adjustment layer; 2301—liquid crystal microdroplet; 2302—polymer monomer; 2304—liquid crystal molecule; 2303—liquid crystal layer; and 202—insulating protective layer.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
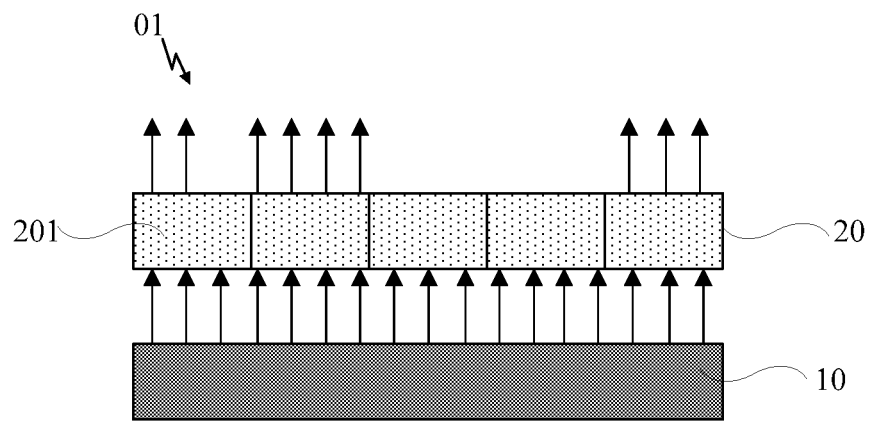
FIG. 1 is a schematic diagram of a backlight module provided by an embodiment of the present disclosure.

An embodiment of the present disclosure provides a backlight module 01, as illustrated by FIG. 1, including a light source component 10, an illumination rendering film 20 disposed on a light exiting side of the light source component 10.

Figure 2:
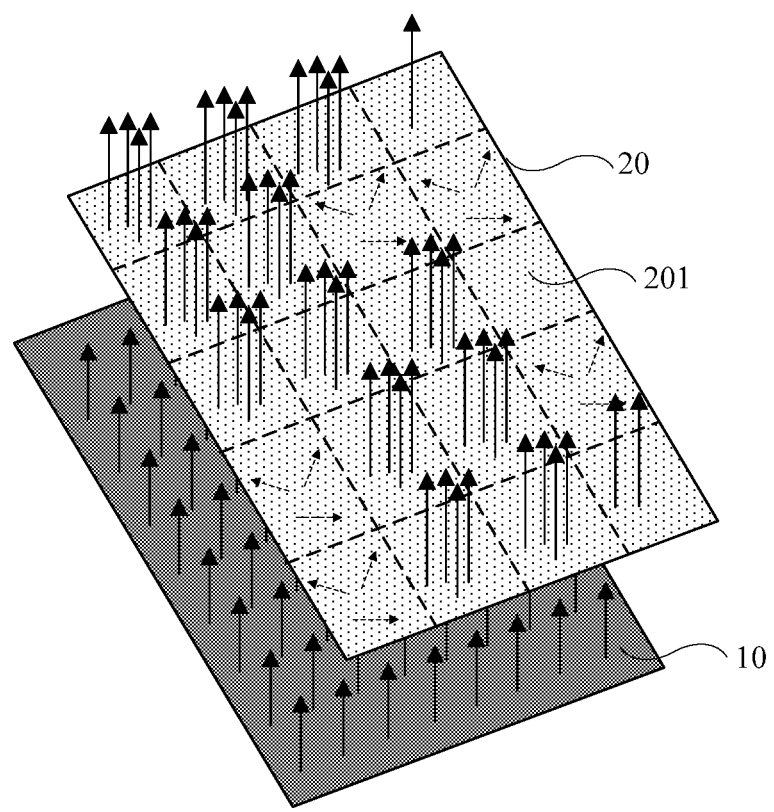
FIG. 2 is a schematic diagram of transmittances of the dimming units in the illumination rendering film in FIG. 1.

As illustrated by FIG. 2, the illumination rendering film 20 includes a plurality of dimming units 201 arranged in an array. Each of the dimming units 201 is configured to receive a dimming signal and change a transmittance of the dimming unit 201 according to the dimming signal.

Furthermore, the abovementioned light source component 10 includes a light source used for providing light. For example, the light source can be formed by an LED lamp or an LED strip.

In some examples, the abovementioned backlight module 01 can be applied to a display device that includes a processor. The processor can separately send the dimming signal to each of the dimming units 201. The processor can be disposed in the backlight module 01 or disposed outside the backlight module 01.

In a case where the abovementioned backlight module 01 is applied to a display device, before an image frame is displayed, the processor can divide the image to be displayed into a plurality of regions, and each of regions corresponds to one of the dimming units 201. Then, the processor judges whether each of the regions in the image is a bright field region or a dark field region, and generates the abovementioned dimming signal according to the judging result, so that each of the dimming units 201 can change its transmittance according to the dimming signal after receiving the dimming signal. In this way, the transmittance of the dimming unit 201 corresponding to the bright field region is increased, and the transmittance of the dimming unit 201 corresponding to the dark field region is lowered. After the abovementioned dimming process, the bright field region in the displayed image is brighter and the dark field region in the displayed image is darker, so that more image details can be displayed, and a purpose of high dynamic illumination rendering can be achieved.

Figure 3A:
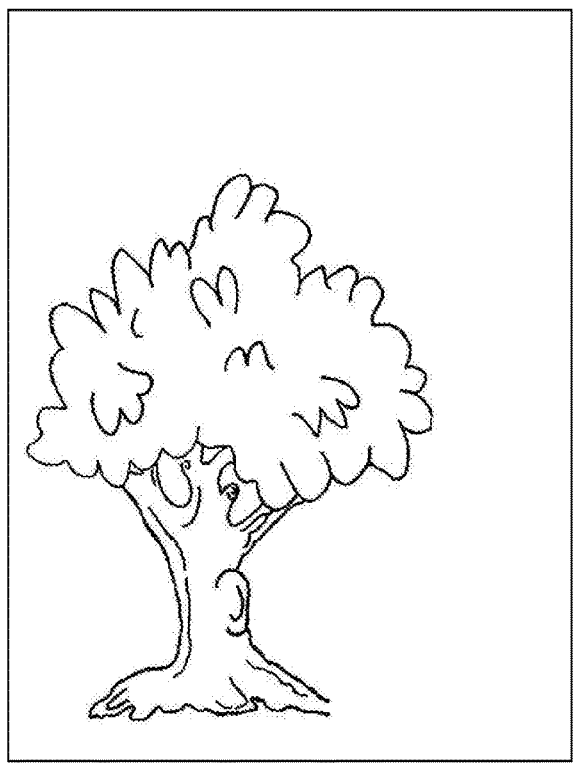
FIG. 3a is a schematic diagram of a display image without local dimming.
Figure 3B:
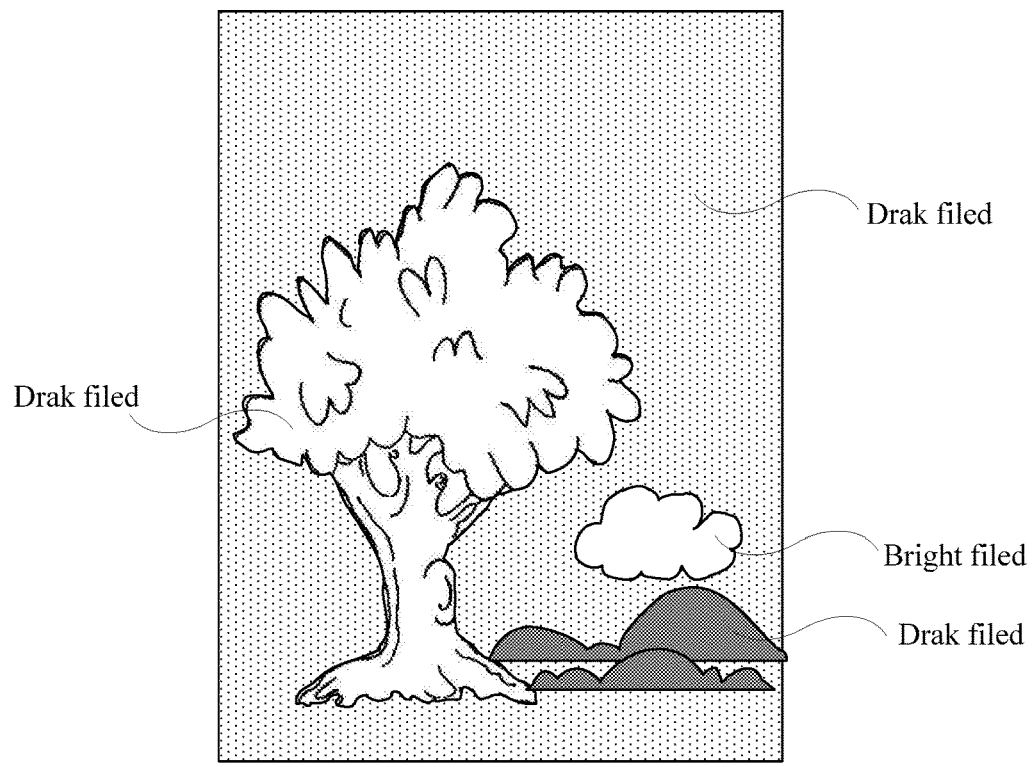

For example, FIG. 3a is an image without the abovementioned dimming process, in which the entire background behind the tree is whitish. As illustrated by FIG. 3b, the image shown in FIG. 3a is rendered by the abovementioned high dynamic illumination. For example, the processor divides the entire image into a plurality of regions, and determines that the tree, the mountain, and the blue sky belong to the dark field regions, and the white cloud belongs to the bright field region. On this basis, a plurality of dark field regions or bright field regions can be sorted according to the brightness degrees or darkness degrees of the regions divided from the image to be displayed. For example, the darkness degrees of the tree, the mountain, and the blue sky in FIG. 3a are successively decreasing. Therefore, the transmittances of the dimming units 201 corresponding to the dark field regions where the tree, the mountain, and the blue sky are respectively located are sequentially increased. The dimming unit 201 corresponding to the bright field area where the white cloud is located has the highest transmittance, so that the details of the scenery behind the tree can be displayed. In this way, by providing the illumination rendering film 20 having the plurality of dimming units 201 in the backlight module, the purpose of local dimming can be achieved, so that the details of the displayed image are clearer. To sum up, the abovementioned local dimming process does not have to adjust the light sources in the light source component 10, thus, the problem that the serve life of the light sources is lowered caused by the repeated adjustments of the light sources can be avoided.

Hereinafter, some exemplary structures of the abovementioned dimming unit 201 will be described in detail.

Figure 4:
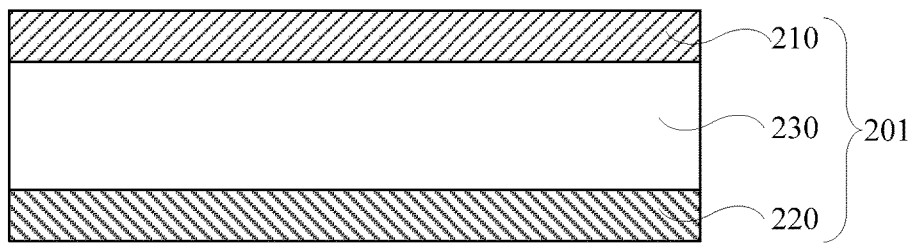
FIG. 4 is a schematic structural diagram of a dimming unit in FIG. 1.

In some examples, as illustrated by FIG. 4, the abovementioned dimming unit 201 includes a first electrode 210 and a second electrode 220 which are located opposite to each other, and a transmittance adjustment layer 230 between the first electrode 210 and the second electrode 220.

The abovementioned example is described by taking a case where the first electrode and the second electrode are located on two sides of the transmittance adjustment layer as an example. However, the embodiments of the present disclosure are not limited thereto, as long as an electrical filed for controlling the transmittance of the transmittance adjustment layer can be applied, any suitable control electrode can be applied to the abovementioned dimming unit.

The abovementioned processor can output the dimming signal to the first electrode 210 and the second electrode 220, respectively. The first electrode 210 and the second electrode 220 which are located opposite to each other can generate an electric field for controlling a haze of the transmittance adjustment layer 230 according to the dimming signal. That is, upon the electric field generated by the first electrode 210 and the second electrode 220 being different, the haze of the transmittance adjustment layer 230 is also different.

For example, a material constituting the first electrode 210 and the second electrode 220 can be a transparent conductive material, such as: indium tin oxide (ITO) or indium zinc oxide (IZO).

Figure 5:
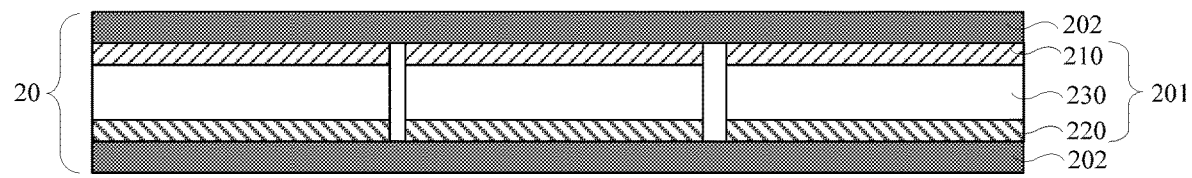
FIG. 5 is a schematic structural diagram of an illumination rendering film in FIG. 1.

In some examples, in order to protect the outer surface of the first electrode 210 and/or the second electrode 220, or to prevent the first electrode 210 and the second electrode 220 from being electrically connected with other components and causing a short circuit, as illustrated by FIG. 5, the abovementioned illumination rendering film 20 further includes an insulating protective layer 202 covering the first electrode 210 and/or the second electrode 220.

In some examples, in order to increase the transparency of the illumination rendering film 20, a material forming the insulating protective layer 202 can be a transparent resin material, such as: polyethylene terephthalate (PET).

Figure 6:
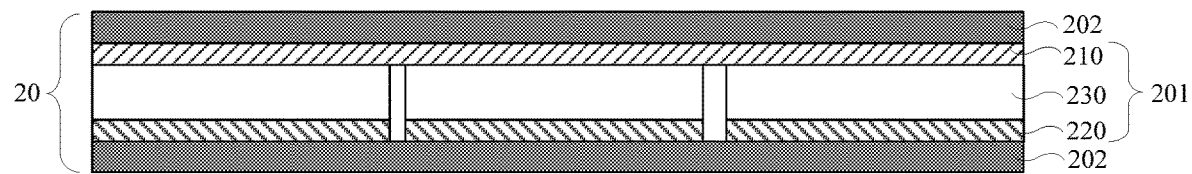
FIG. 6 is a schematic structural diagram of another illumination rendering film in FIG. 1.

As seen, the adjacent dimming units 201 need to be independently controlled. That is to say, the plurality of dimming units can independently receive different dimming signals, so as to independently control the brightness of different regions of the backlight module. In this case, the structure of the abovementioned illumination rendering film 20 is illustrated by FIG. 5, the structures of two adjacent dimming units 201 are provided with a gap or a barrier wall therebetween. Alternatively, as illustrated by FIG. 6, the first electrodes 210 (or second electrodes 220) of all the dimming units 201 are connected, and two adjacent second electrodes 220 (or first electrodes 210) are provided with a gap or a barrier wall therebetween, and two adjacent transmittance adjustment layers 230 are provided with a gap or a barrier wall therebetween.

Hereinafter, some exemplary structures of the abovementioned transmittance adjustment layer 230 will be described in detail.

Figure 7:
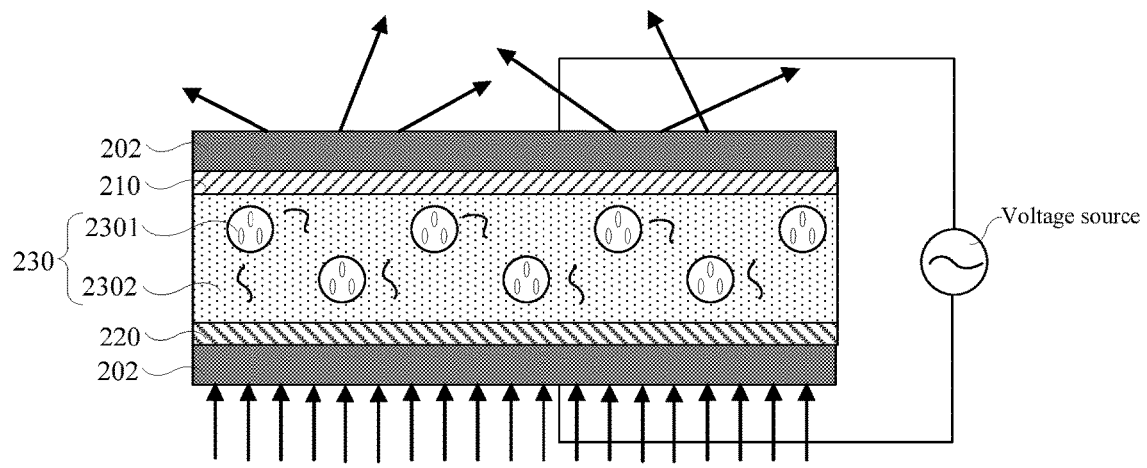
FIG. 7 is a schematic diagram of a light transmitting state of the transmittance adjustment layer in FIG. 4.

For example, as illustrated by FIG. 7, the abovementioned transmittance adjustment layer 230 includes a polymer dispersed liquid crystal (PDLC). The PDLC includes a polymer monomer 2302 and liquid crystal droplets 2301 dispersed in the polymer monomer 2302. The polymer monomer 2302 has a large proportion in the polymer dispersed liquid crystal layer, so that the liquid crystal can be dispersed in the polymer monomer in the form of liquid crystal droplets.

In some examples, in consideration of the manufacturing costs and production precision, a thickness of the abovementioned polymer dispersed liquid crystal layer is, for example, 120 μm±5 μm.

In order to make the first electrode 210 and the second electrode 220 which are respectively located on two sides of the polymer dispersed liquid crystal layer be able to generate an electric field therebetween, as illustrated by FIG. 7, the first electrode 210 and the second electrode 220 can be connected to a voltage source. And the voltage source is connected with the abovementioned processor. According to the dimming signal output from the processor to the first electrode 210 and the second electrode 220, the voltage source outputs a voltage matching the dimming signal to the first electrode 210 and the second electrode 220, respectively.

Figure 8:
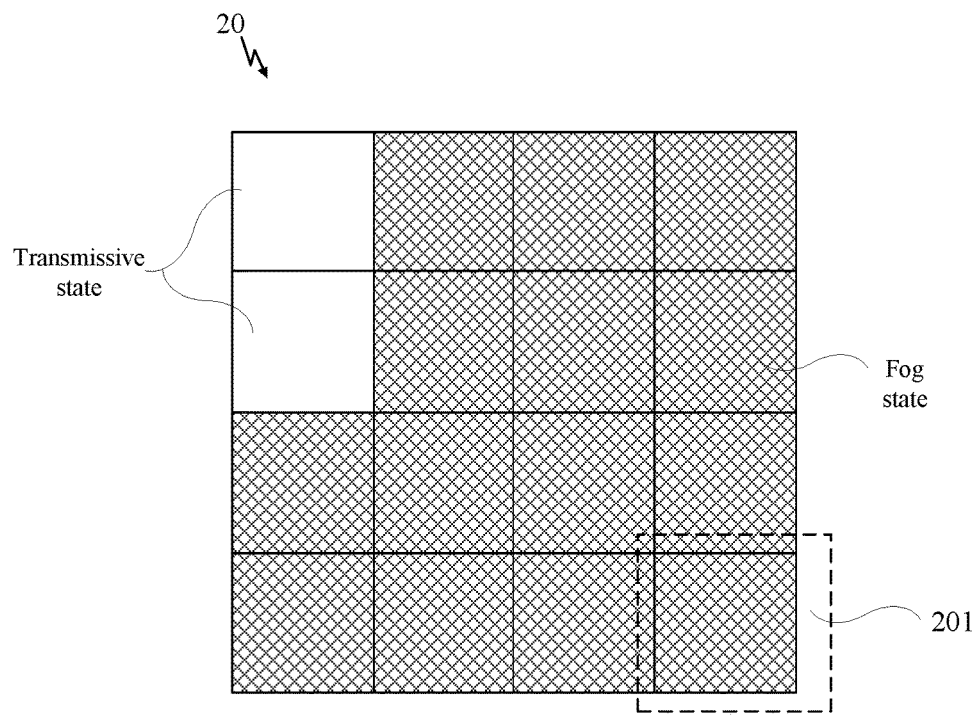
FIG. 8 is a schematic diagram of a light transmitting state of the dimming units of the transmittance adjustment layer in FIG. 1.

For example, upon the voltage applied to the first electrode 210 and the second electrode 220 being relatively small, for example, around 0 V, the electric field generated by the first electrode 210 and the second electrode 220 is too weak to drive the deflection direction of the liquid crystal molecules in the liquid crystal droplets 2301 to change. Therefore, liquid crystal molecules in each of the liquid crystal droplets 2301 are arranged in a disordered manner in each of the liquid crystal droplets 2301. In this case, most of the light incident on the PDLC is dispersed by the disordered liquid crystal molecules, so that parallel light emitted from the light source component 10 cannot be emitted in a parallel state. In this case, the haze of the transmittance adjustment layer 230 is relatively large, and light transmitting rate of the parallel light is only 5%. The dimming unit 201 including the transmittance adjustment layer 230 is in a fog state as illustrated by FIG. 8. In this case, a region corresponding to the dimming unit 201 in the image to be displayed receives less parallel light and has a relatively small brightness.

Alternatively, upon the voltage applied to the first electrode 210 and the second electrode 220 being relatively large, for example, an alternating current (AC) of about 30 V. In this case, the first electrode 210 and the second electrode 220 can generate a certain electric field, and under the action of the electric field, the liquid crystal molecules in the liquid crystal droplets 2301 are driven to deflect. For example, the electric field at the position where the liquid crystal molecules in the same dimming unit 201 are located is the same, so the deflection angles of the liquid crystal molecules in the same dimming unit 201 are also the same.

Figure 9:
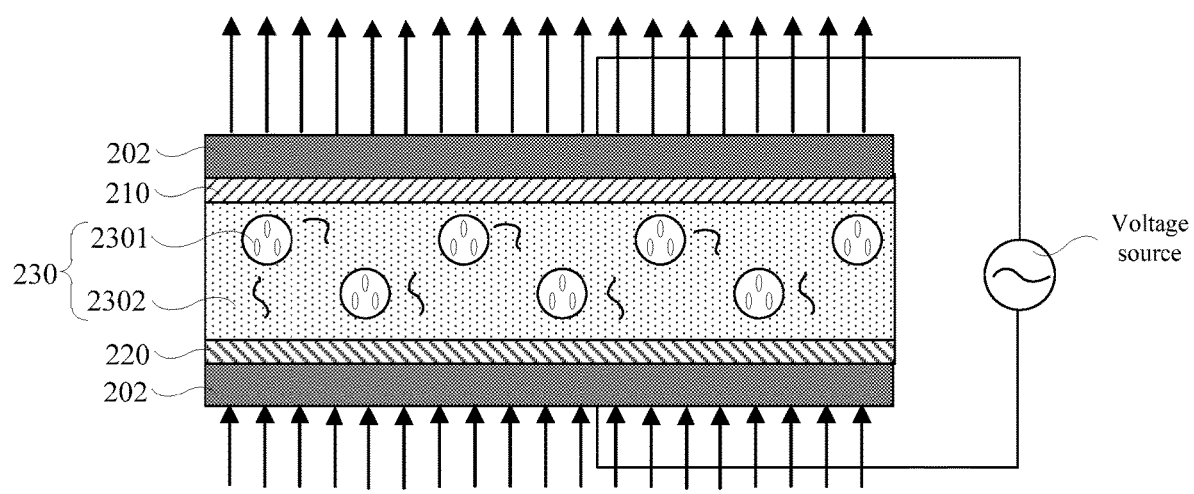
FIG. 9 is a schematic diagram of another light transmitting state of the transmittance adjustment layer in FIG. 4.

In this case, liquid crystal molecules in the same dimming unit 201 are arranged in an orderly manner in each of the liquid crystal droplets 2301. As illustrated by FIG. 9, most of the light incident on the PDLC can keep parallel and be emitted in a parallel state. In this case, upon the voltage applied to the first electrode 210 and the second electrode 220 being maximum, the haze of the transmittance adjustment layer 230 is 2%, and light transmitting rate of parallel light can reach 90%. The dimming unit 201 having the adjustment layer 230 is in a transmissive state as illustrated by FIG. 8. In this case, a region corresponding to the dimming unit 201 in the image to be displayed receives more parallel light and has a relatively large brightness.

For example, by adjusting the magnitude of the voltage applied to the first electrode 210 and the second electrode 220, the transmittance of each of the dimming units 201 can be adjusted within a range of 5% to 90%, such that regions corresponding to different dimming units 201 in the image to be displayed receive different amount of parallel light, so as to achieve the purpose of local dimming. Based on this, the transmittances of the plurality of dimming units 201 in the transmissive state (or the fog state) in FIG. 8 can be different.

It should be noted that, FIG. 8 exemplarily shows two dimming units 201 having a transmissive state. However, the number of dimming units 201 having a transparent state or a fog state is not limited in the present disclosure. Those skilled in the art can set according to the image to be displayed.

Figure 10:
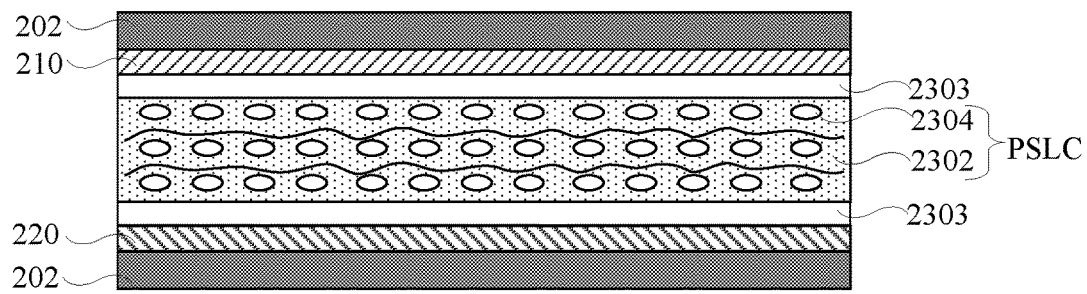
FIG. 10 is a schematic structural diagram of the transmittance adjustment layer in FIG. 4.

In some examples, as illustrated by FIG. 10, the abovementioned transmittance adjustment layer 230 includes a polymer stabilized liquid crystal (PSLC) and two alignment layers 2303 located on two sides of the polymer stabilized liquid crystal layer.

For example, the PSLC includes liquid crystal molecules 2304 with a relatively high content, so as to be in a continuous phase. In addition, a polymer monomer 2032 is also included. The polymer monomer 2032 is dispersed in a network form by liquid crystal molecules 2304.

In this case, upon the voltage applied to the first electrode 210 and the second electrode 220 being relatively small, for example, 0 V, the electric field generated by the first electrode 210 and the second electrode 220 is too weak to drive the deflection direction of the liquid crystal molecules 2304 to change. Therefore, the liquid crystal molecules 2304 are arranged in an orderly manner under the orientation of the abovementioned alignment layers 2303. In this case, refractive index of the liquid crystal molecules 2304 matches refractive index of the polymer monomer 2032, such that most of the light incident to the PSLC can keep parallel and be emitted in a parallel state. In this case, the transmittance adjustment layer 230 has a relatively high transmittance and a relatively low haze, so that the dimming unit 201 having the transmittance adjustment layer 230 is in a transmissive state as illustrated by FIG. 8. A region corresponding to the dimming unit 201 in the image to be displayed receives more parallel light, and has a relatively large brightness.

Alternatively, upon the voltage applied to the first electrode 210 and the second electrode 220 being increased, because the first electrode 210 and the second electrode 220 are capable of generating a certain electric field, the liquid crystal molecules 2304 can be driven to deflect in a direction of the electric field. In this case, the refractive index of the liquid crystal molecules 2304 does not match the refractive index of the polymer monomer 2032, such that the transmittance of the transmittance adjustment layer 230 is lowered, so that the dimming unit 201 including the transmittance adjustment layer 230 is in a fog state as illustrated by FIG. 8. A region corresponding to the dimming unit 201 in the image to be displayed receives less parallel light and has a relatively small brightness.

In summary, by adjusting the magnitude of the voltage applied to the first electrode 210 and the second electrode 220, the matching degree between the refractive index of the liquid crystal molecules 2304 and the refractive index of the polymer monomer 2032 can be adjusted, so that regions corresponding to different dimming units 201 in the image to be displayed receive different amount of parallel light, so as to achieve the purpose of local dimming.

Figure 11:
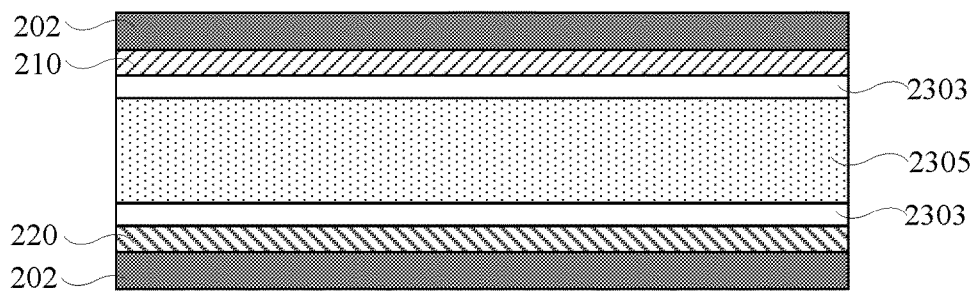
FIG. 11 is a schematic structural diagram of the transmittance adjustment layer in FIG. 4.

In some examples, as illustrated by FIG. 11, the abovementioned transmittance adjustment layer 230 includes a liquid crystal layer 2305 and two alignment layers 2303 located on two sides of the liquid crystal layer 2305. The liquid crystal layer 2305 includes liquid crystal molecules 2304 which are evenly distributed.

In this case, the deflection directions of the liquid crystal molecules 2304 in the liquid crystal layer 2305 can be controlled by a vertical electric field formed by the first electrode 210 and the second electrode 220, so as to adjust the transmittance of the liquid crystal layer 2305. Finally, the purpose of adjusting the transmittance of the transmittance adjustment layer 230 is achieved, so that the dimming units 201 corresponding to the dark field regions in the image to be displayed are in a fog state, and the dimming units 201 corresponding to the bright field regions in the image to be displayed are in a transmissive state.

Hereinafter, some exemplary structures of the light source component 10 in FIG. 1 will be described in detail with reference to different types of backlight modules.

Figure 12:
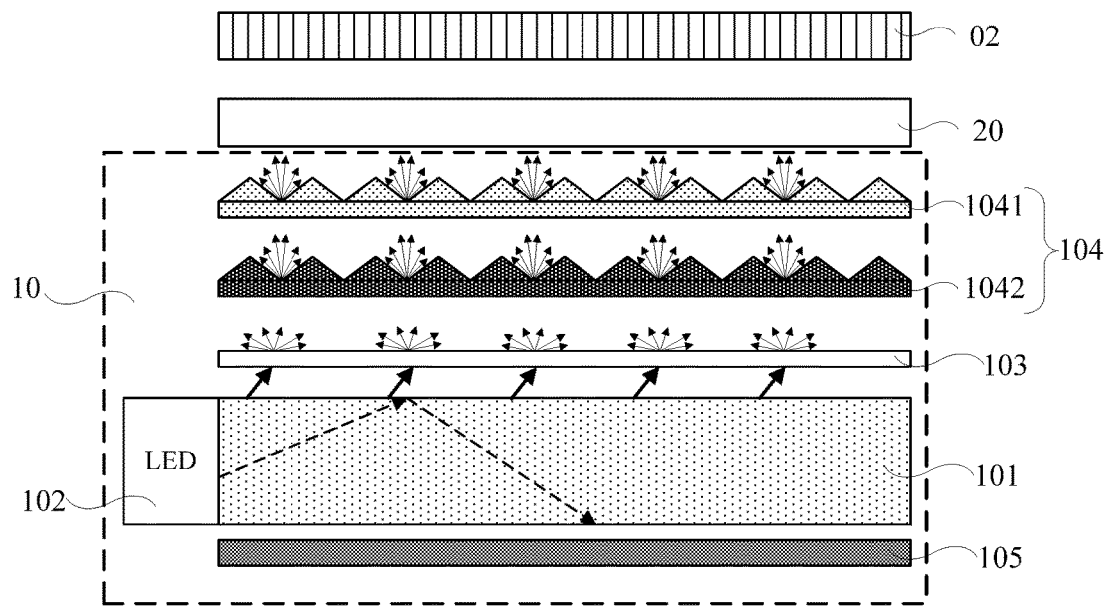
FIG. 12 is a schematic structural diagram of a display device provided by an embodiment of the present disclosure.

For example, the abovementioned backlight module 01 is of an edge-lit type as illustrated by FIG. 12. The light source component 10 includes a light guide plate 101 and a light source 102 located on at least one lateral face of the light guide plate 101. The light source 102 includes a plurality of LED lamps arranged in a row. Or, the light source 102 is an LED strip.

For example, light of the light source 102 provided on a lateral face of the light guide plate 101 incident from the lateral face of the light guide plate 101 can be introduced to the entire light incident surface of the illumination rendering film 20 through the light guide plate 101.

Furthermore, the light source component 10 further includes a diffusion sheet 103 and at least one prism sheet 104 which are located on the side of the light exit surface of the light guide plate 101, and a reflective sheet 105 on the opposite side of the light exit surface of the light guide plate 101.

The diffusion sheet 103 is used for diffusing light to increase the diffusivity of the light emitted from the light source component 10.

Figure 13:
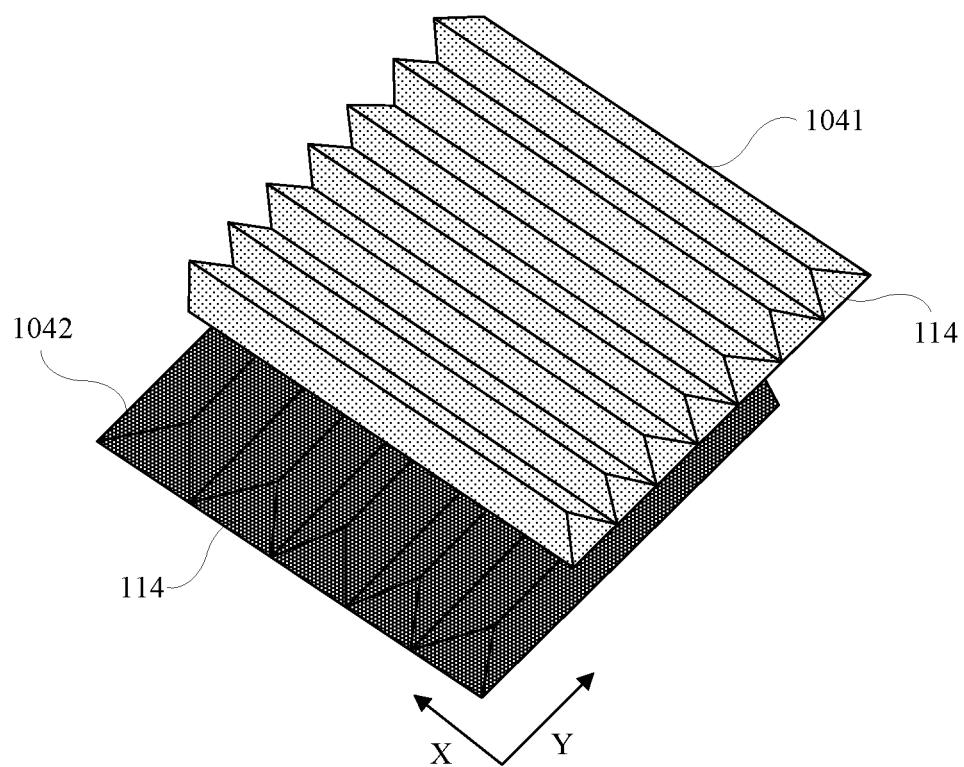
FIG. 13 is a schematic structural diagram of the first prism sheet and the second prism sheet in FIG. 11.

In addition, the prism sheet 104 can concentrate the light passing through the diffusion sheet 103 in a smaller range, so as to achieve a brightening effect. Based on this, the at least one prism sheet 104 includes a first prism sheet 1041 and a second prism sheet 1042. As illustrated by FIG. 13, an extending direction X of prism 114 on the first prism sheet 1041 is perpendicular to an extending direction Y of prism 114 on the second prism sheet 1042. In this way, the first prism sheet 1041 can brighten the emitting light in the X direction. The second prism sheet 1042 can brighten the emitting light in the Y direction, so that the brightness of the light emitted through the entire prism sheet 104 is uniform.

In addition, the reflective sheet 105 can reflect light emitted from the light source 102 to the light guide plate 101 and the diffusion sheet 103, so that the utilization ratio of the light emitted from the light source 102 can be improved.

Figure 14:
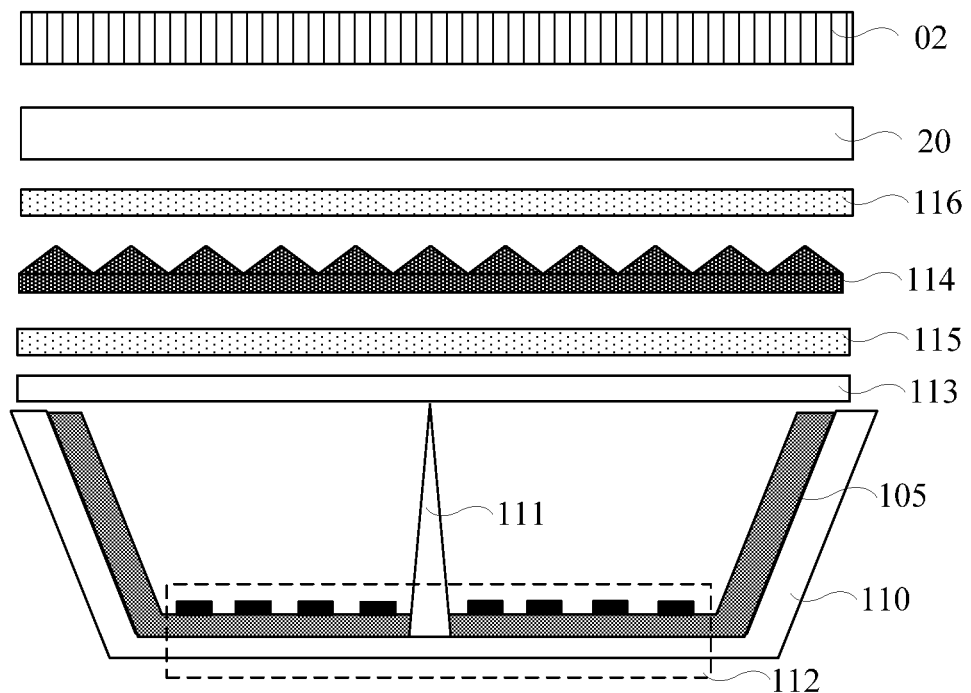
FIG. 14 is a schematic structural diagram of another display device provided by an embodiment of the present disclosure.

In some examples, the backlight module 01 is of a direct-lit type. The light source component 10 of FIG. 14 includes a light source array 112 disposed on the back plate 110, and a diffusion plate 113 and at least one prism sheet 104 which are sequentially located on a light exiting side of the light source array 112.

The structure of the prism sheet 104 is the same as the structure described above, and will be omitted herein. Alternatively, the prism sheet 104 can simultaneously include a prism 114 extending in the X direction and a prism 114 extending in the Y direction.

Furthermore, the above direct type further includes a lower diffusion sheet 115 and an upper diffusion sheet 116 which are respectively located on two sides of the prism sheet 104. For example, the lower diffusion sheet 115, the upper diffusion sheet 116, and the diffusion plate 113 have the same function.

It should be noted that: because the direct-lit type backlight module 01 has a high requirement for the light mixing distance, the diffusion plate 113 and the back plate 110 need to be provided with a support column 111 therebetween. As a result, the thickness of the direct type backlight module 01 is relatively large. The light source 102 in the edge-lit backlight module 01 is disposed on a lateral face of the light guide plate 101, so the thickness of the edge-lit backlight module 01 is relatively small.

The embodiments of the present disclosure provide a display device, including any one of the abovementioned backlight modules 01 and a display panel 02 disposed on the light exit side of the backlight module 01. For example, the display panel can be a liquid crystal display panel. In addition, the display device further includes the abovementioned processor for outputting a dimming signal to the dimming unit 201 in the backlight module 01.

It should be noted that the display device has the same beneficial effects as the backlight module provided in the foregoing embodiment, and details are omitted herein.

In addition, in the embodiments of the present disclosure, the display device can be any product or component having a display function, such as a liquid crystal display, a liquid crystal television, a digital photo frame, a mobile phone, or a tablet computer.

The foregoing is only the embodiments of the present invention and not intended to limit the scope of protection of the present invention, and the protection scope of the present disclosure should be based on the protection scope of the claims.

What is claimed is:
1. A backlight module, comprising:
a light source component; and an illumination rendering film located on a light exiting side of the light source component,
wherein the illumination rendering film comprises a plurality of dimming units arranged in an array,
each of the dimming units is configured to receive a dimming signal and change a transmittance of the each of the dimming units according to the dimming signal,
wherein each of the dimming units comprises a transmittance adjustment layer and a control electrode for controlling the transmittance adjustment layer, the control electrode is configured to generate an electric field for controlling a transmittance of the transmittance adjustment layer according to the dimming signal,
the transmittance adjustment layer comprises a polymer stabilized liquid crystal layer and two alignment layers respectively located on two sides of the polymer stabilized liquid crystal layer, and
the polymer stabilized liquid crystal layer includes liquid crystal molecules in a continuous phase and a polymer monomer dispersed in a network form.

2. The backlight module according to claim 1, wherein the control electrode comprises a first electrode and a second electrode which are located on two opposite sides of the transmittance adjustment layer.

3. The backlight module according to claim 2, wherein the illumination rendering film further comprises an insulating protective layer covering a side of the first electrode and/or the second electrode away from the polymer stabilized liquid crystal layer.

4. The backlight module according to claim 2, wherein
upon a voltage applied to the first electrode and the second electrode being relatively small, a refractive index of the liquid crystal molecules matches a refractive index of the polymer monomer, so as to make the transmittance adjustment layer have a relatively high transmittance, and
upon the voltage applied to the first electrode and the second electrode being relatively large, the refractive index of the liquid crystal molecules is different from the refractive index of the polymer monomer, so as to make the transmittance adjustment layer have a relatively low transmittance.

5. The backlight module according to claim 1, wherein controlling the transmittance of the transmittance adjustment layer comprises controlling a haze of the transmittance adjustment layer.

6. The backlight module according to claim 1, wherein the transmittance adjustment layer comprises a polymer dispersed liquid crystal layer.

7. The backlight module according to claim 6, wherein the polymer dispersed liquid crystal layer has a thickness of 120 µm ±5 µm.

8. The backlight module according to claim 1, wherein the light source component comprises a light guide plate and a light source located on at least one lateral face of the light guide plate.

9. The backlight module according to claim 8, wherein the light source component further comprises a diffusion sheet located on a light exiting side of the light guide plate, at least one prism sheet, and a reflective film located on a side opposite the light exiting side of the light guide plate.

10. The backlight module according to claim 9, wherein the at least one prism sheet comprises a first prism sheet and a second prism sheet, the first prism sheet comprises a prism extending in a first direction, the second prism sheet comprises a prism extending in a second direction, and the first direction and the second direction are perpendicular to each other.

11. The backlight module according to claim 1, wherein the light source component comprises a light source array, and a diffusion plate and at least one prism sheet which are sequentially located on a light exiting side of the light source array.

12. The backlight module according to claim 1, further comprising: a processor configured to provide the dimming signal to each of the dimming units.

13. The backlight module according to claim 1, wherein the plurality of dimming units are configured to be capable of independently receiving different dimming signals.

14. A display device, comprising:
a display panel; and
the backlight module according to claim 1, configured to provide light for the display panel.

15. The display device according to claim 14, wherein the control electrode comprises a first electrode and a second electrode which are located on two opposite sides of the transmittance adjustment layer.

16. The display device according to claim 14, wherein controlling the transmittance of the transmittance adjustment layer comprises controlling a haze of the transmittance adjustment layer.

* * * * *